United States Patent
Yamaguchi et al.

(10) Patent No.: US 6,896,754 B2
(45) Date of Patent: May 24, 2005

(54) DUSTFREE FILLING AND SEALING APPARATUS, DUSTFREE CONTAINER AND WRAPPING CLEAN FILM PRODUCING METHOD

(75) Inventors: Masahisa Yamaguchi, Shinjuku-Ku (JP); Hiroshi Yamamoto, Shinjuku-Ku (JP); Koji Otsuka, Shinjuku-Ku (JP)

(73) Assignee: Dai Nippon Printing Co., Ltd. (JP)

( * ) Notice: Subject to any disclaimer, the term of this patent is extended or adjusted under 35 U.S.C. 154(b) by 362 days.

(21) Appl. No.: 10/145,699

(22) Filed: May 16, 2002

(65) Prior Publication Data

US 2003/0062114 A1 Apr. 3, 2003

Related U.S. Application Data

(62) Division of application No. 08/889,612, filed on Jul. 10, 1997, now abandoned, which is a continuation of application No. 08/114,052, filed on Aug. 31, 1993, now abandoned.

(30) Foreign Application Priority Data

| Sep. 2, 1992 | (JP) | ................................................ 234976 |
| Mar. 31, 1993 | (JP) | ................................................ 74560 |
| Mar. 31, 1993 | (JP) | ................................................ 74561 |
| Mar. 31, 1993 | (JP) | ................................................ 74562 |
| Mar. 31, 1993 | (JP) | ................................................ 74563 |
| Apr. 1, 1993 | (JP) | ................................................ 76006 |

(51) Int. Cl.$^7$ ............................................. B32B 31/08

(52) U.S. Cl. ..................... 156/182; 156/230; 156/247; 156/244.11; 156/272.6; 156/344

(58) Field of Search ...................... 156/244.11, 272.6, 156/306.3, 344, 182, 230, 233, 247, 238; 428/41.7

(56) References Cited

U.S. PATENT DOCUMENTS

| 2,392,594 | A | | 1/1946 | Karfiol et al. ......... 156/244.16 |
| 3,043,716 | A | | 7/1962 | Busse et al. ........... 156/244.12 |
| 3,560,288 | A | * | 2/1971 | Takeshi ..................... 156/229 |
| 4,011,947 | A | | 3/1977 | Sawyer ...................... 206/363 |
| 4,233,367 | A | | 11/1980 | Ticknor et al. ........ 156/244.14 |
| 4,270,965 | A | * | 6/1981 | Torterotot et al. ..... 156/244.11 |
| 4,330,353 | A | * | 5/1982 | Kunimoto et al. .......... 156/314 |
| 4,351,876 | A | * | 9/1982 | Doi et al. ................... 428/349 |
| 4,461,667 | A | | 7/1984 | Pupp .......................... 156/247 |
| 4,559,266 | A | * | 12/1985 | Misasa et al. .............. 428/341 |
| 4,623,587 | A | * | 11/1986 | Ito et al. ..................... 428/335 |
| 4,837,088 | A | | 6/1989 | Freedman .............. 156/244.11 |
| 4,886,698 | A | | 12/1989 | Purdy .................... 156/244.16 |

(Continued)

FOREIGN PATENT DOCUMENTS

| JP | 62-99129 | | 5/1987 | |
| JP | 07330020 A | * | 12/1995 | ........... B65D/65/40 |

OTHER PUBLICATIONS

Semiconductor International, p. 108, May 1991.

English Language Translation of p. 4, col. 1, Lines–8–18 of JP 62–909129.

*Primary Examiner*—Gladys J P Corcoran
(74) *Attorney, Agent, or Firm*—Parkhurst & Wendel, L.L.P.

(57) ABSTRACT

A dustfree filling and sealing apparatus is disclosed. A pair of wrapping clean films 10 which are free of cleaning are supplied from a pair of wrapping clean film supply means 1. Two outer layer films 10b are peeled off and removed from the wrapping clean films 10 by a pair of outer layer film peeling-off means 2. Thus, clean surfaces of inner layer films 10a appear. The two inner layer films 10a are conveyed by a pair of inner layer film conveying means 4 so that these films are opposed. An object 15 is inserted between the inner layer films 10a by an object filling means 5. The inner layer films 10a are sealed by an impulse seal head 6. The present invention also discloses a wrapping clean film producing method and a dustfree container.

8 Claims, 8 Drawing Sheets

U.S. PATENT DOCUMENTS

| | | | | |
|---|---|---|---|---|
| 4,935,079 A | * | 6/1990 | Nelson-Ashley et al. | 156/82 |
| 4,940,634 A | * | 7/1990 | Mueller et al. | 428/349 |
| 5,089,353 A | * | 2/1992 | Negi et al. | 428/518 |
| 5,266,387 A | * | 11/1993 | Fujii et al. | 428/213 |
| 5,273,811 A | * | 12/1993 | Fujii et al. | 428/215 |
| 6,066,404 A | * | 5/2000 | Suzuura et al. | 428/516 |
| 6,074,678 A | * | 6/2000 | Blackwelder et al. | 426/129 |
| 6,280,085 B1 | * | 8/2001 | Beer | 383/210 |

* cited by examiner

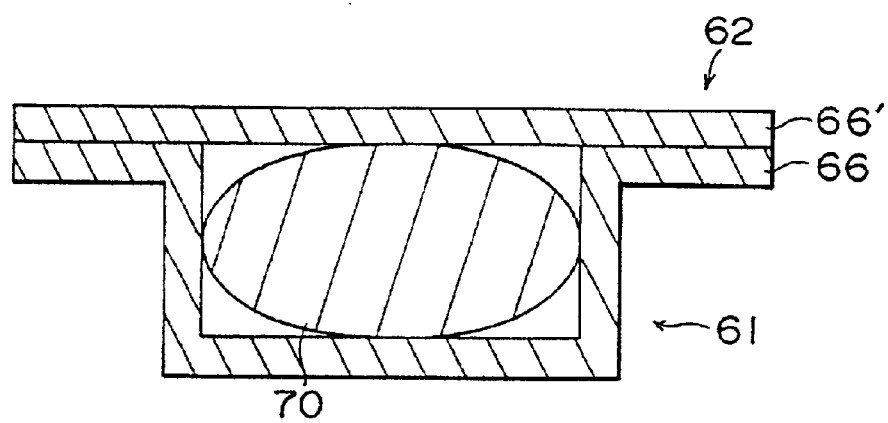
F I G. 14
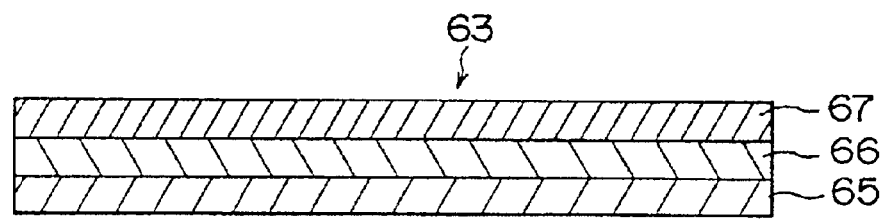
F I G. 15
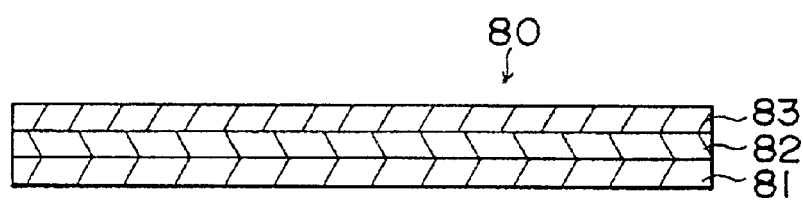
F I G. 16
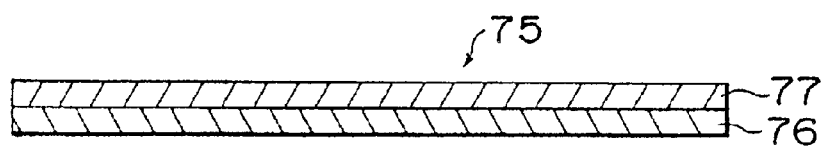
F I G. 17

DUSTFREE FILLING AND SEALING APPARATUS, DUSTFREE CONTAINER AND WRAPPING CLEAN FILM PRODUCING METHOD

This is a Division of application Ser. No. 08/889,612 filed Jul. 10, 1997 now abandoned, which in turn is a Continuation of Ser. No. 08/114,052 filed Aug. 31, 1993, now abandoned.

BACKGROUND OF THE INVENTION

1. Field of the Invention

The present invention relates to a dustfree filling and sealing apparatus for wrapping such as a semiconductor product which is much delicately and adversely affected by dirt and dust and cloths for use in producing such a product. The present invention also relates to a dustfree container and a wrapping clean film producing method.

2. Description of the Related Art

Since semiconductor products such as IC chips and LSI chips are much delicately and adversely affected by dirt and dust, they are produced in a clean room. In addition, wrapping materials which wrap products which are produced in such a clean atmosphere and cloths which are used in producing such products must be free of dirt and dust.

Conventionally, wrapping materials are produced in a clean room and then cleaned with ultrapure water.

In addition, a filling and sealing apparatus which automatically wrapping objects with such wrapping materials has been used.

However, in the conventional filling and sealing apparatus, a cleaning means which cleans wrapping materials produced in a clean room with ultrapure water is required. Thus, the construction of the apparatus becomes complicated and the wrapping cost increases. In addition, depending on the cleanness of the wrapping materials, the reliability of cleanness of the wrapping materials varies.

SUMMARY OF THE INVENTION

The present invention is made from the above-described point of view. An object of the present invention is to provide a dustfree filling and sealing apparatus which omits a cleaning means for cleaning wrapping materials with ultrapure water and which has stable cleanness. Another object of the present invention is provide a dustfree container and a wrapping clean film producing method.

A first aspect of the present invention is a dustfree filling and sealing apparatus, comprising a wrapping film supply means for supplying a pair of wrapping clean films, each of the wrapping clean film being composed of at least three layers of lamination films which are one inner layer film and two inner layer films, the inner layer film being adapted for wrapping an object, the outer layer films being adapted for coating both front and rear surfaces of the inner layer film so as to prevent the inner layer film from being contaminated, an outer layer film peeling-off means for peeling off each of the outer layer films from the wrapping clean film supplied by the wrapping film supply means, an inner layer film conveying means for conveying the inner layer films of the wrapping clean films whose outer layer films are peeled off by the outer layer film peeling-off means, an outer film winding means for winding the outer layer films peeled off by the outer layer peeling-off means, an object filling means for inserting the object between the pair of inner layer films conveyed by the inner layer film conveying means, and a seal head for sealing the pair of inner layer films between which the object is inserted.

According to the first aspect of the present invention, a wrapping clean film is composed of at least three films which are one inner layer film and two outer layer films. The inner layer film wraps an object. The two outer layer films coat the front and rear surfaces of the inner layer film, thereby preventing the inner layer film from being contaminated. When the outer layer films are peeled off from the inner layer film, the clean surfaces of the inner layer film appear.

This wrapping clean film is produced by laminating the inner layer film and the two outer layer films according to co-extrusion method. In the wrapping clean film, the front and rear surfaces of the inner layer film are not directly exposed to outer air after and before the wrapping film is produced. Thus, dirt and dust do not adhere to the front and rear surfaces of the inner layer film. Thus, when the wrapping clean film is used, it is not necessary to clean it with ultrapure water.

In the dustfree filling and sealing apparatus, a pair of wrapping clean film supply means which are oppositely disposed supply respective wrapping clean films to the respective outer layer film peeling-off means in such a way that the two wrapping clean films are opposed.

The outer layer film peeling-off means each peel off the outer layer films from the wrapping clean film. The peeled outer layer films are wound by the respective outer layer film winding means. The inner layer film conveying means convey the inner layer films to the object filling means in such a way that these inner layer films are opposed.

The object filling means inserts an object such as a semiconductor product into the two opposed inner layer films.

Thereafter, the impulse seal head seals the two inner layer films and thereby the object is wrapped in dustfree condition.

The wrapping clean film supply means and the outer layer film peeling-off means are disposed in a positive electric filed so as to prevent dirt and dust from entering these means.

A second aspect of the present invention is a method for producing a wrapping clean film having an inner layer film and two outer layer films, the inner layer film being adapted for wrapping an object, the two outer layer films being adapted for peelably coating both front and rear surface of the inner layer film, the method comprising the steps of preparing a resin for the inner layer film with low density polyethylene, preparing a resin for the outer layer films with homo-polypropylene resin whose ethylene content is 1% by weight or less, and co-extruding the resins for the outer layer films and the resin for the inner layer film at a temperature of 230° C. or below in which the resins for the outer layer films are provided on both surfaces of the resin for the inner layer film.

A third aspect of the present invention is a method for producing a wrapping clean film, comprising the steps of preparing a heat-resisting substrate, preparing at least two types of thermoplastic resins, and co-extruding the thermoplastic resins on both front and rear surfaces of the heat-resisting substrate so as to form coating films composed of at least two layers of thermoplastic resin films on both the front and rear surfaces of the heat-resisting substrate, wherein outermost thermoplastic resin films of the coating films are peelable.

A fourth aspect of the present invention is a method for producing a wrapping clean film, comprising the steps of preparing a heat-resisting substrate, forming co-extruded films composed of at least two layers of thermoplastic resin films by co-extrusion, and laminating the co-extruded films on both front and rear surfaces of the heat-resisting substrate by dry-lamination, wherein outermost thermoplastic resin films of the co-extruded films are peelable.

A fifth aspect of the present invention is a method for producing a wrapping clean film, comprising the steps of laminating a heat-resisting substrate and a polyolefin film so as to form an intermediate layer, applying bonding agents on both front and rear surfaces of the intermediate layer so as to form bonding agent layers, the bonding agent layers being adapted to be interfacially peeled off from the intermediate layer, and laminating cover-films on the bonding agent layers, wherein the cover films are peelable together with the bonding agent layers from the intermediate layer.

A sixth aspect of the present invention is a dustfree container, comprising a main body having an accommodating portion for accommodating an object, and a cover member for covering the accommodating portion of the main body, wherein the main body and the cover member are made of a clean film, the clean film being composed of an inner layer film and an outer layer film which is provided on the surface of the inner layer film for peelably coating the inner layer film.

According to the sixth aspect of the present invention, the dustfree container is composed of a main body and a cover member. The main body accommodates an object. The cover member is used for covering the accommodating portion of the main body. The main body and the cover member are made of a clean film. The clean film is composed of an inner layer film and an outer layer film which are laminated in such a way that the outer layer film can be peeled off from the front surface of the inner layer film. In other words, when the outer layer film is peeled off, a clean surface of the inner layer film appears. Thus, for example, the dustfree container where the outer layer film of each clean film which forms the main body and the cover member is peeled off and thereby the clean surface thereof appears. Thereafter, in a clean room, an object is accommodated in the main body and then the main body is sealed with the cover member. Thus, the object is wrapped. The wrapped object is accommodated in an outer bag made of the clean film. Consequently, the object is dual-wrapped. The dual-wrapped object is conveyed to another clean room. In the clean room, the outer bag and the cover member of the dustfree container are removed. In this condition, since dirt and dust do not fly, they never adhere to the object.

A seventh feature of the present invention is a wrapping clean film, comprising an inner layer film for wrapping an object, and two outer layer films for peelably coating front and rear surfaces of the inner layer film so as to prevent the inner layer film from being contaminated.

A eighth feature of the present invention is a wrapping clean film, comprising an inner layer film for wrapping an object, and an outer layer film for peelably coating a surface of the inner layer film so as to prevent the inner layer film from being contaminated.

These and other objects, features and advantages of the present invention will become more apparent in light of the following detailed description of best mode embodiments thereof, as illustrated in the accompanying drawings.

BRIEF DESCRIPTION OF DRAWINGS

FIG. 14 is a sectional view schematically showing the dustfree container where the outer layer films of the main body and the cover member are peeled off and the clean surfaces of the inner layer films appear;

FIG. 15 is a sectional view showing the composition of layers of an example of a clean film which is the material of each of the main body and the cover member of the dustfree container of the present invention;

FIG. 16 is a sectional view showing a wrapping clean film having an inner layer film according to a seventh embodiment of the present invention and two outer layer film which coats the inner layer film; and FIG. 17 is a sectional view showing wrapping clean film having the inner layer film according to the seventh embodiment of the present invention and an outer layer film which coats the inner layer film.

DESCRIPTION OF PREFERRED EMBODIMENTS

First Embodiment 1-1 Basic Construction

Next, with reference to the accompanying drawings, a first embodiment of the present invention will be described.

Figure 1:
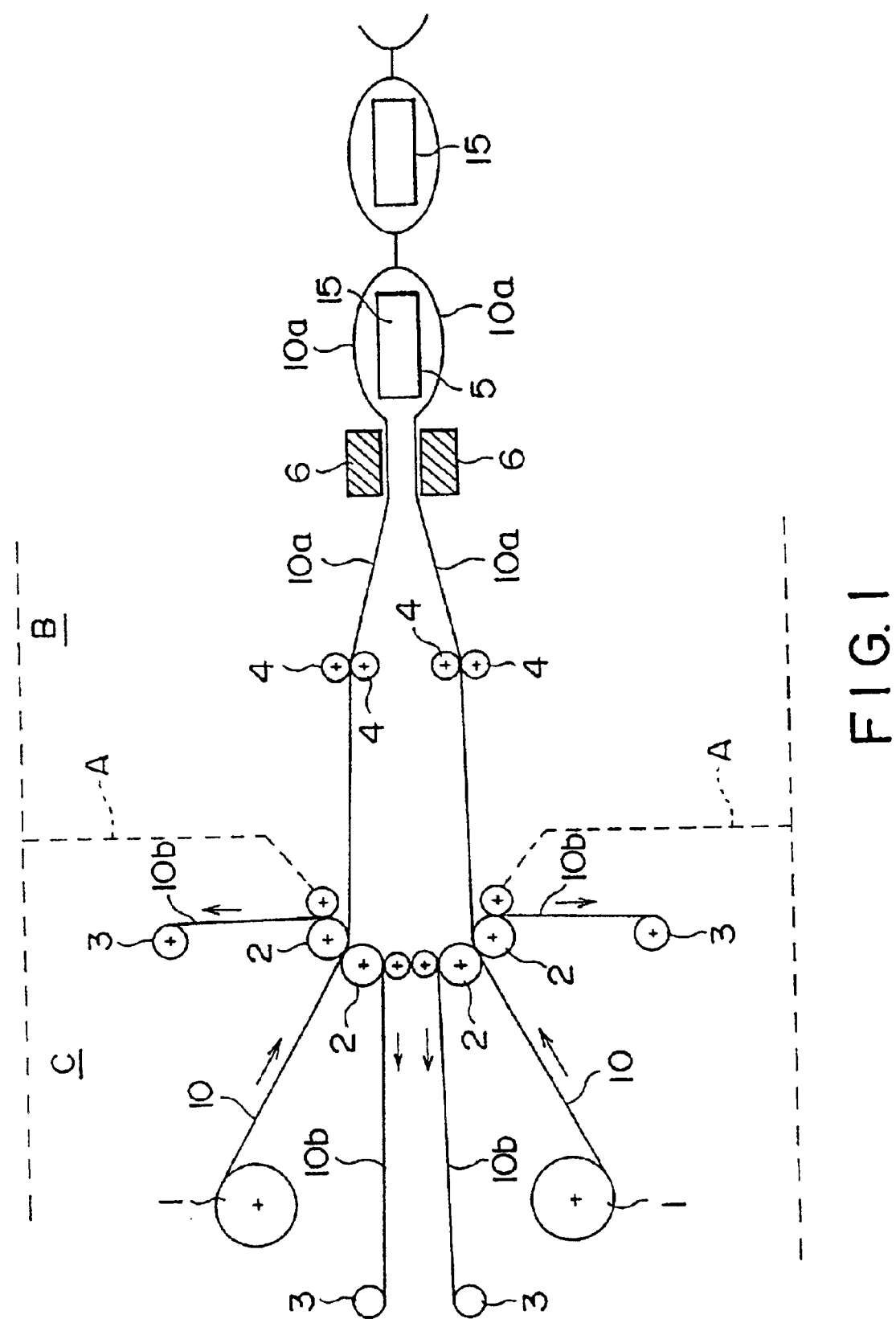
FIG. 1 is schematic diagram for explaining the construction of a dustfree filling and sealing apparatus according to a first embodiment of the present invention.

FIG. 1 is a schematic diagram showing the construction of a dustfree filling and sealing apparatus according to a first embodiment of the present invention.

As shown in the figure, the dustfree filling and sealing apparatus comprises a pair of wrapping clean film supply means 1, a pair of outer layer film peeling-off means 2, a pair of outer layer film winding means 3, a pair of inner layer film conveying means 4, an object filling means 5, and an impulse seal head 6. The impulse seal head 6 seals two inner layer films 10*a* into which an object is inserted.

Figure 2:
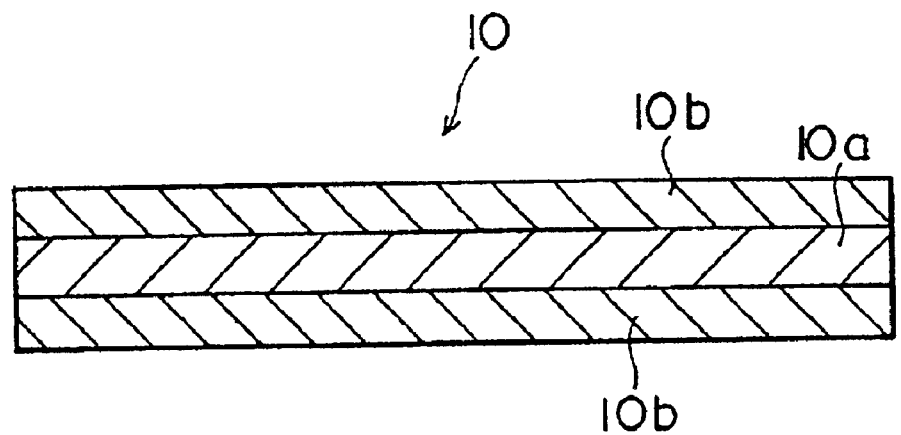
FIG. 2 is a sectional view showing an example of a wrapping clean film for use in the dustfree filling and sealing apparatus of the present invention.

A wrapping clean film 10 is supplied from each of the wrapping clean film supply means 1. As shown in FIG. 2, the wrapping film 10 is composed of at least one inner layer film 10*a* and two outer layer films 10*b* which are co-extruded. The outer layer films 10*b* are applied to both the front and rear surfaces of the inner layer film 10*a* for coating the inner layer film 10*a*.

The inner layer film 10*a* is used for a wrapping material which is directly in contact with an object 50 such as a semiconductor product. When the wrapping clean film 10 is used, the outer layer films 10*b* which are applied to both the front and rear surfaces of the inner layer film 10*a* are peeled off therefrom. Since the inner layer film 10*a* and the two outer layer films 10*b* are laminated by co-extrusion method, the front and rear surfaces of the inner layer film 10*a* are not directly exposed to outer air. Thus, dirt and dust never adhere to the front and rear surfaces of the inner layer film 10*a*.

Examples of the material of the inner layer film 10*a* are polyethylene resin, ethylene vinyl acetate copolymer (EVA), ionomer resin, straight-chain low-density polyethylene (LLDPE), ethylene vinyl alcohol copolymer (EVOH), and polyvinyl alcohol resin (PVA).

Figure 3:
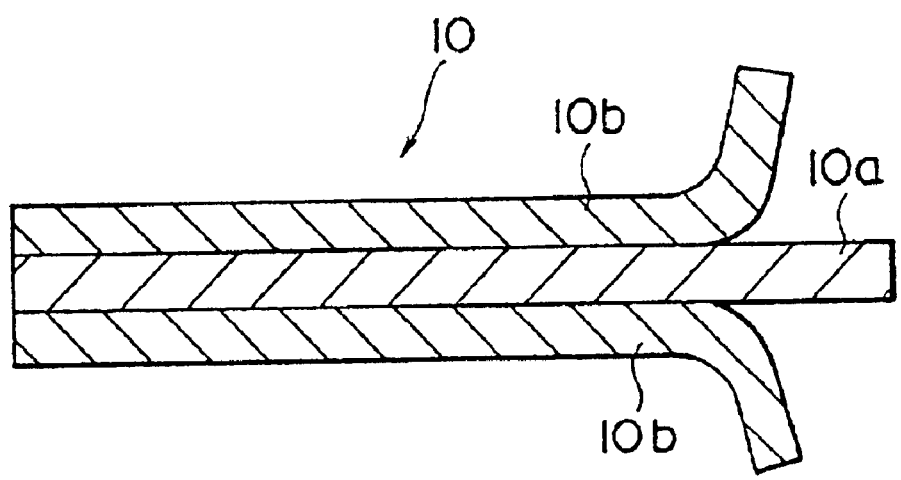
FIG. 3 is a sectional view for explaining the condition where outer layer films of the wrapping clean film of FIG. 2 are peeled off.

The outer layer films 10*b* which are applied to the front and rear surfaces of the inner layer film 10*a* can be easily peeled off and removed from the inner layer film 10*a*. Thus, as shown in FIG. 3, when the inner layer film 10*a* is used, by peeling off and removing the outer layer films 10*b*, clean surfaces of the inner layer film 10*a* appear because the outer layer films 10*b* prevent dirt and dust from adhering to the front and rear surfaces of the inner layer film 10*a*.

The material of the outer layer films 10*b* is preferably a substance which less adheres to the inner layer film 10*a*. The material of the outer layer films 10*b* is selected corresponding to the property of the material of the inner layer film 10*a*. When the inner layer film 10*a* is made of low density polyethylene, polypropylene is preferably used as the material of the outer layer films 10*b*.

Each of the outer layer films 10*b* may be composed of a single layer which is made of a single material. Alternatively, each of the outer layer films 10*b* may be composed of a plurality of layers which are made of a single material or a plurality of materials.

The two outer layer films 10*b* of the wrapping clean film 10 are supplied from the pair of wrapping clean film supply means 1 which are oppositely disposed. The two outer layer films 10*b* are peeled off from the inner layer film 10*a* by the pair of outer layer film peeling-off means 2.

The pair of outer layer film peeling-off means 2 are practically peeling-off rollers.

The two outer layer films 10*b* which are peeled off by the pair of outer layer film peeling-off means 2 are wound by the pair of outer layer film winding means 3. The pair of outer layer film winding means 3 have winding rollers.

The two inner layer films 10*a* whose clean surfaces appear are conveyed to the object filling means 5 by the pair of inner film conveying means 4 in such a way that the two inner layer films 10*a* are opposed.

In the object filling means 5, the object 15 is inserted between the two inner layer films 10*a* which are oppositely disposed.

Practically, conventional vacuum pack method or nitrogen gas wrapping method is used in the object filling means 5.

In the vacuum pack method, the object 15 is inserted between the two inner layer films 10*a*. The three sides of each of the two inner layer films 10*a* are heat-sealed. The inside of the inner layer films 10*a* is deaerated. Thereafter, the remaining side of each of the inner layer films 10*a* is heat-sealed.

In the nitrogen gas wrapping method, the object 15 is inserted into the two inner layer films 10*a*. Next, the three sides of each of the inner layer films 10*a* are heat-sealed. Thereafter, air in the inner layer films 10*a* is substituted with nitrogen gas. Thereafter, the remaining side of each of the inner layer films 10*a* is heat-sealed.

The two inner layer films 10*a* are heat-sealed by the impulse head 6.

In the dustfree filling and sealing apparatus, as shown in FIG. 1, the pair of inner layer film conveying means 4, the object filling means 5, and the impulse seal head 6 are disposed in a clean room (on the right of dotted line A of FIG. 1). Thus, the object 15 is wrapped in a dustfree atmosphere.

On the other hand, the pair of wrapping clean film supply means 1 and the pair of outer layer film peeling-off means 2 are disposed in a positive pressure atmosphere c (on the left of the dotted line A of FIG. 1) so as to prevent dirt and dust from entering these means.

1-2 Effect

As described above, according to the first embodiment of the present invention, since the wrapping clean film where the clean surfaces of the inner layer film appear by peeling off the outer layer films is used, it is not necessary to clean the wrapping clean film with ultrapure water. Thus, a wrapping material cleaning facility is not required. In addition, an object can be securely wrapped free of dust.

Second Embodiment 2-1 Basic Construction

Figure 4:
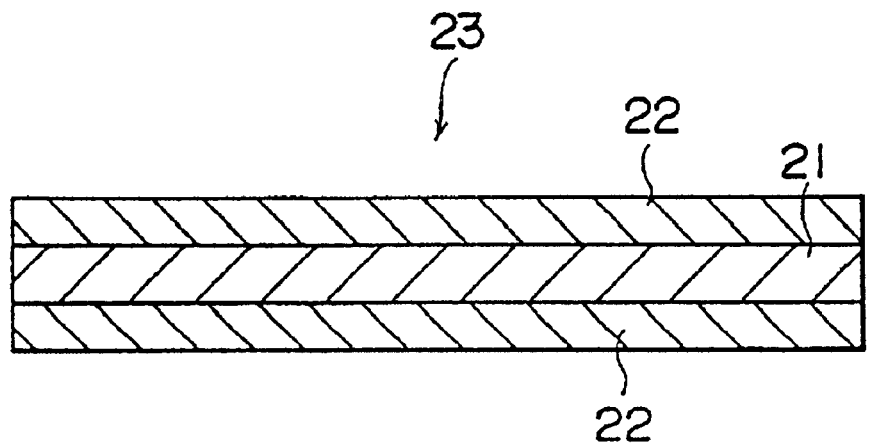
FIG. 4 is a sectional view showing the composition of layers of a wrapping clean film produced by a producing method according to a second embodiment of the present invention.

Next, a clean film producing method according to a second embodiment of the present invention will be described. A resin which forms an inner layer film and another resin which forms outer layer films which is applied to the inner layer film for peelably coating the front and rear surfaces of the inner layer film are co-extruded in a molten state from an extruder by for example T-die method. Thus, as shown in FIG. 4, one inner layer film 21 and two outer layer films 2 are laminated.

The co-extruding temperature is 230° C. or below, preferably 220° C. or below. This is because when the co-extruding temperature exceeds 230° C., the peeling property of the outer layer films 22 to coat the front and rear surfaces of the inner layer film 21 may deteriorate.

The inner layer film 21 is used for a wrapping material which is directly in contact with an object such as a semiconductor product. When the wrapping clean film used, the outer layer films 22 to coat both the front and rear surfaces of the inner layer film 21 are peeled off therefrom. Since the inner layer film 21 and the two outer layer films 22 are laminated by co-extrusion method, the front and rear surfaces of the inner layer film 21 are not directly exposed to outer air while and after the wrapping clean film is produced. Thus, dirt and dust never adhere to the front and rear surfaces of the inner layer film 21 after the wrapping clean film is produce and until it is used.

An example of the material of the inner layer film 21 is low density polyethylene (LDPE) with a density in a range from 0.900 to 0.960 g/cm$^3$, preferably in a range from 0.915 to 0.930 g/cm$^3$. This is because the low density polyethylene (LDPE) less penetrates vapor, less absorbs moisture, and is inexpensive. When the density of the low density polyethylene is less than 0.900 g/cm$^3$, a blocking may take place, thereby deteriorating the peeling property against the outer layer films 22. On the other hand, when the density of the low density polyethylene exceeds 0.960, the inner layer film 21 may become weak and thereby easily breakable.

The thickness of the inner layer film 21 is normally in a range from 10 to 300 μm, preferably in a range from 30 to 120 μm. When the thickness of the inner layer film 21 is less than 10 μm, it is likely to be broken. On the other hand, when the thickness of the inner layer film 21 exceeds 120 μm, the production cost thereof may increase.

Figure 5:
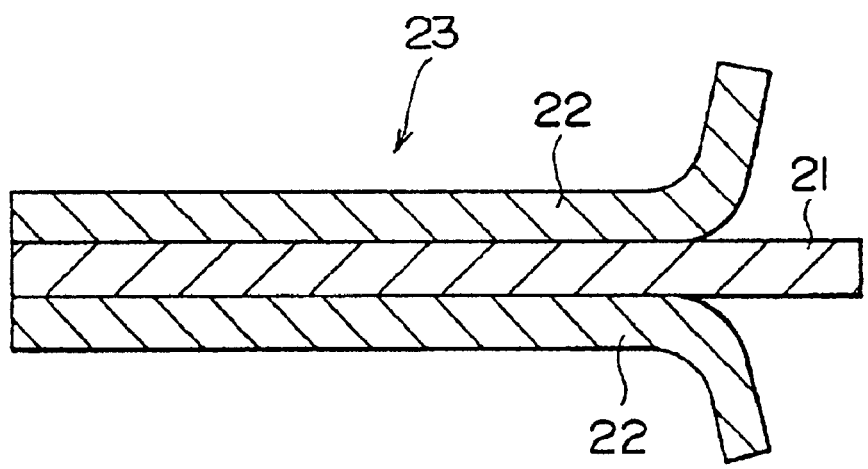
FIG. 5 is a sectional view for explaining the condition where outer layer films of the wrapping clean film of FIG. 4 are peeled off.

The outer layer films 22 to coat the front and rear surfaces of the inner layer film 21 prevent dirt and dust from adhering to the front and rear surfaces thereof. In addition, the outer layer films 22 can be easily peeled off and removed from the inner layer film 21. Thus, as shown in FIG. 5, when the inner layer film 21 is used, by peeling off and removing the outer layer films 22, clean surfaces of the inner layer film 21 appear because the outer layer films 22 prevent dirt and dust from adhering to the front and rear surfaces of the inner layer film 21.

An example of the material of the outer layer films 22 which have the above-described properties is homo-polypropylene whose ethylene content is 1% by weight or less. This is because the homo-polypropylene has a high film forming property with the inner layer film 21 made of the low density polyethylene (LDPE) and high peeling property. When the content of the ethylene in the homo-polypropylene exceeds 1% by weight, peeling property between layers may deteriorate.

The thickness of the outer layer films 22 is normally in a range from 10 to 100 μm, preferably in a range from 30 to 80 μm. When the thickness of each of the outer layer films 22 is less than 10 μm, they may be difficult to be peeled off from the inner layer film 21. On the other hand, when the thickness of each of the outer layer films 22 exceeds 100 μm, the production cost thereof increases.

The thickness of each of the outer layer films 22 to coat the front and rear surfaces of the inner layer film 21 may be the same or different from each other.

When the width of the wrapping clean film produced in the above-described manner is 600 mm, the inter-layer peeling strength thereof is preferably 50 g/15 mm wide or less. When the inter-layer peeling strength is 50 g/15 mm wide or less, it is equal to 2 kg/600 mm wide. Thus, the outer layer films 22 can be peeled off by a roll support.

When an object such as a semiconductor product is wrapped with the wrapping clean films produced in the method according to this embodiment of the present invention, the dustfree filling and sealing apparatus as shown in FIG. 1 may be preferably used. The object which is wrapped with the wrapping clean films is completely free from dirt and dust.

2-2 PRACTICAL EXAMPLE

Next, a practical example according to this embodiment of the present invention and compared examples thereof will be practically described.

Practical Example 1

By two 50 mm φ extruders, homo-type polypropylene whose ethylene content was 1% by weight or less (MITSUI PETROCHEMICAL INDUSTRIES, LTD., "LA-221", density=0.91 g/cm$^3$, MFR=26) was extruded. In addition, by a 100 mm φ extruder, low density polyethylene (NIPPON UNICAR CO., LTD., "NUC 8160", density=0.923 g/cm$^3$, MI=2.4 g/10 min.) was extruded. By a 1000 mm wide multi-manifold multi-layer T die, these materials were co-extruded at an extruding temperature of 220° C. Thus, a wrapping clean film where 30 μm thick outer layer films were laminated on the front and rear surfaces of a 50 μm thick inner layer film were produced.

Next, the inter-layer peeling strength of the three-layered co-extruded film was measured. The measured result is shown in Table 2-1.

TABLE 2-1

|  | Peeling strength [g/15 mm wide] |
| --- | --- |
| Practical example 1 | 42 |
| Compared example 1 | 84 |
| Compared example 2 | 65 |

The inter-layer peeling strength of each example was measured in the following conditions.

| Tensile strength test device | TENSILON |
| --- | --- |
| Velocity | 100 mm/min |
| Angle | 180° |

Compared Example 1

A three-layered co-extruded film was produced in the same manner as the practical example 1 except that a copolymer type polypropylene resin (CHISSO PETROCHEMICAL CORP., "F-8298", density=0.90, MFR=18) was used instead of the homo type polypropylene whose ethylene content was 1% by weight or less (MITSUI PETROCHEMICAL INDUSTRIES, LTD., "LA-221", density= 0.91, MFR=26).

Next, the inter-layer peeling strength of the three-layered co-extruded film was measured in the same manner as the practical example 1. The measured result is shown in Table 2-1.

Compared Example 2

A three-layered co-extruded film was produced in the same manner as the practical example 1 except that the co-extruding temperature was 240° C. instead of 220° C.

Next, the inter-layer peeling strength of the three-layered co-extruded film was measured in the same manner as the practical example 1. The measured result is shown in Table 2-1.

(Evaluation of Measured Results)

As is clear from Table 2-1, the inter-layer peeling strength of the three-layered co-extruded film produced in the practical example 1 is much smaller than that of the three-layered co-extruded films produced in the compared examples 1 and 2. Thus, it was revealed that the three-layered co-extruded film produced in the practical example 1 is suitable for a clean film.

2-3 Effect

As described above, according to the second embodiment of the present invention, since a wrapping clean film which is composed of an inner layer film made of a low density polyethylene and two outer layer films made of a predetermined polypropylene where the two outer layer films are applied to the front and rear surfaces of the inner layer film and are pelable therefrom is produced by a co-extrusion method at a predetermined extruding temperature. Thus, dirt and dust never adhere to the inner layer film and thereby it is not necessary to clean the inner layer film. As a result, a wrapping clean film which can suitably wraps for example a semiconductor product can be easily and effectively produced.

Third Embodiment 3-1 Basic Construction

Figure 6:
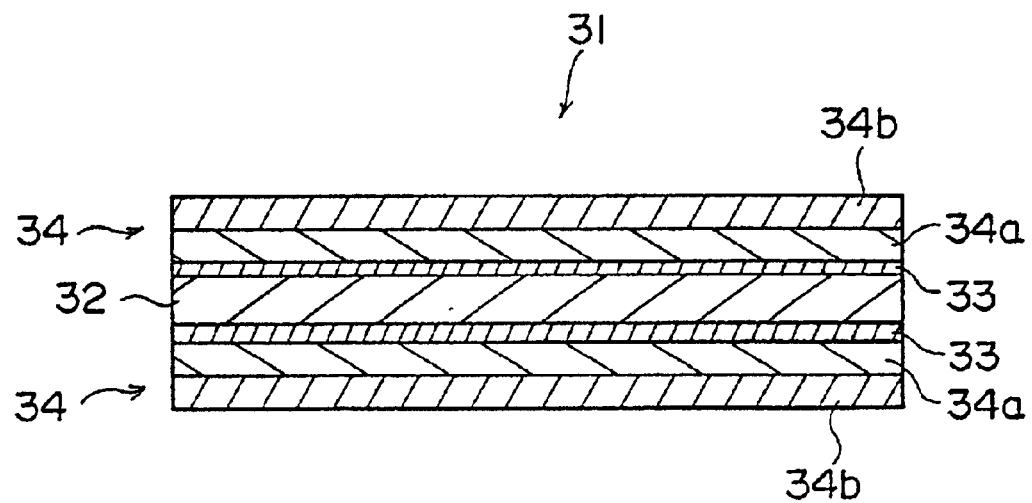
FIG. 6 is a sectional view showing the composition of layers of a wrapping clean film produced by a producing method according to a third embodiment of the present invention.
Figure 7:
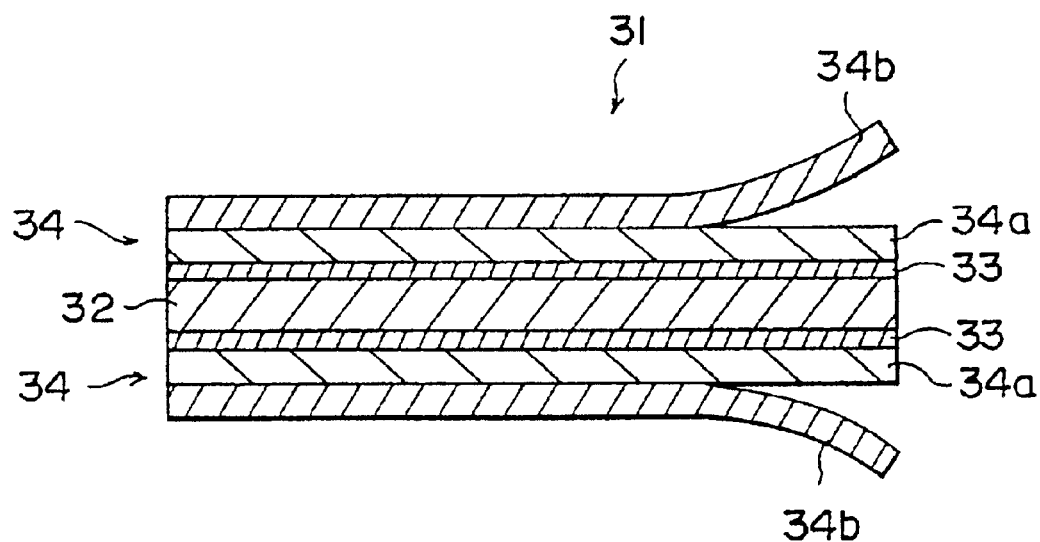
FIG. 7 is a sectional view for explaining the condition where outer layer films of the wrapping clean film of FIG. 6 are peeled off.

With reference to FIGS. 6 and 7, a wrapping clean film producing method according to a third embodiment of the present invention will be described. As shown in these figure, two films 34 which are made of at least two layers of thermoplastic resin films 34a and 35b are co-extruded on the front and rear surfaces of a heat-resisting substrate 32.

Examples of the material of the heat-resisting substrate 32 are a stretch nylon (Ony) film, a vinylidene-chloride-film-coated stretch nylon film (KON), a polyethylene terephthalate (PET) film, a vinylidene-chloride-film-coated polyethylene terephthalate (KPET) film, an ethylene acetic vinylalcohol soap (EVOH) film, a polychlorinated vinylidene (PVDC) film, an aluminum foil, an inorganic (for example, silica) oxide evaporated PET, and an aluminum evaporated PET. In these examples, a biaxial stretch nylon (ONy) film and a biaxial stretch PET film are much preferable.

Since the thickness of the heat-resisting substrate depends on the characteristics thereof, the type of an object to be wrapped, and so forth, it is difficult to designate the thickness of the heat-resisting substrate. The thickness of the heat-resisting substrate is normally in a range from 10 to 30 $\mu$m.

When necessary, printing may be performed on either or both the surfaces of the heat-resisting substrate 32.

In the wrapping clean film producing method according to this embodiment of the present invention, the two films 34 each of which is composed of at least two layers of thermoplastic resin films 34a and 35b are co-extruded on the front and rear surfaces of the heat-resisting substrate 32 directly or preferably through respective anchor coat layers 33.

The anchor coat layers 33 prevent the films 34 from being interfacially peeled off from the heat-resisting substrate 32. In addition, the anchor coat layers 33 allow only the outermost layer film 34b of the (at least two-layered) thermoplastic resin film 34 (34a and 34b) to be securely peeled off.

The anchor coat layers 33 may be formed by applying an anchor coat agent on both the front and rear surfaces of the heat-resisting substrate. Examples of the material of the anchor coat agent are polyethylene imine group, titanate group, urethane group, and isocyanate group.

When each of the anchor coat layers 33 is formed, the thickness thereof is normally in a range from 0.3 to 3 $\mu$m, preferably in a range from 0.5 to 1.5 $\mu$m.

In the wrapping clean film producing method according to this embodiment of the present invention, the film 34 composed of at least two layers of thermoplastic resin films 34a and 34b are produced by co-extrusion method. Examples of a pair of materials (a film forming resin on the side of heat-resisting substrate/a film forming resin of the outermost layer film) of the heat-plastic resins being co-extruded are (polyethylene (PE)/polypropylene (PP)), (polyethylene (PE)/nylon (Ny)), (polyethylene (PE)/polyethylene terephthalate (PET)), and (polyethylene (PE)/ethylene acetic vinylalcohol soap (EVOH)). Depending on a desired property such as pin-hole resisting property and gas barrier property, these materials may be used in combination.

The film 34 can be formed by extruding two or more thermoplastic resins which are in a molten state according to for example T-die method. Although the co-extruding temperature depends on the combination of thermoplastic resins, it cannot be generally designated. For the combination of the polyethylene (PE) and nylon (Ny), the co-extruding temperature is normally 290° C. or below, preferably 240° C. or below. When the co-extruding temperature exceeds 300° C., the peeling property of the nylon film which forms the outermost layer 34b may deteriorate.

As shown in FIG. 6, the wrapping clean film 31 is formed by co-extruding the films 34 composed of at least two layers of thermoplastic resin films 34a and 34b on the front and rear surfaces of the heat-resisting substrate 32 directly or through the respective anchor layers 33. Since at least two layers of thermoplastic resin films 34a and 34b which form the film 34 are laminated by the co-extrusion method, the surface of each of the thermoplastic resin films 34a is never exposed to outer air while and after the wrapping clean film 31 is produced. Thus, after the wrapping clean film 31 is produced and before it is used, dirt and dust never adhere to the surface of each of the thermoplastic resin films 34a.

As shown in FIG. 7, by peeling off and removing the outermost thermoplastic resin film 34b, a clean surface of the thermoplastic resin film 34a appears. Thus, the wrapping clean film 31 can be used as a wrapping material of an object such as a semiconductor product which requires high cleanness.

As long as the outermost thermoplastic resin film 34b is applied to the front surface of the inner thermoplastic resin film 34a, the peeling strength of the outermost thermoplastic resin film 34b front the inner thermoplastic resin film 34a is preferably as low as possible. In the case that the peeling strength becomes large, when the outermost thermoplastic resin film 34b is peeled off and removed from the inner thermoplastic resin film 34a, large static electricity takes place on the surface of the inner thermoplastic resin film 34a. The large static electricity tends to collect dirt and dust.

3-2 PRACTICAL EXAMPLE

Next, a practical example according to this embodiment of the present invention and compared examples thereof will be practically described.

Practical Example 1

The front surface of a 15 $\mu$m thick stretch nylon (ONy) film (UNITIKA LTD., "EMBLEM ON", density=1.15) was gravure-printed. The resultant film was used as a heat-resisting substrate.

Next, an urethane group anchor coat agent (TOYO MORTON CO., "ADCOAT 506X/CAT 10") was applied on both the front and rear surfaces of the heat-resisting substrate so as to form 1.0 $\mu$m thick anchor coat (AC) layers.

Thereafter, a polyethylene (PE) (NIPPON UNICAR CO., LTD., "NUC 8160", density=0.923 g/cm$^3$, MI=2.4 g/10 min.) and a nylon (Ny) (UBE INDUSTRIES, LTD., "5033B", density=1.14) were co-extruded on the anchor coat (AC) layer so as to form a polyethylene (PE) layer thereon. Thus, a layer composed of a polyethylene film and a nylon film was formed on the anchor coat (AC) layer. Consequently, a wrapping clean film composed of the following layers was produced.

Ny (20 $\mu$m)/PE (40 $\mu$m)/AC/ONy (15 $\mu$m)/print layer/AC/PE (40 $\mu$m)/Ny (20 $\mu$m)

Next, the outermost layer, which is the nylon film, of the wrapping clean film was peeled off and removed. Thereafter, the tensile strength of the resultant wrapping film was measured. The measured result is shown in Table 3-1.

TABLE 3-1

| | Tensile Strength [kg/cm$^2$] |
|---|---|
| Practical example 1 | 2000 |
| Compared example 1 | 400 |

The tensile strength of each example was measured in the following conditions.

| Tensile strength testing device | TENSILON |
|---|---|
| Velocity | 300 mm/min |
| Angle | 180° |

Compared Example 1

A nylon (Ny) (UBE INDUSTRIES, LTD., "5033B", density=1.14) and a polyethylene (PE) (NIPPON UNICAR CO., LTD., "NUC 8160", density=0.923, MI=2.4 g/10 min.) were co-extruded. Thus, a three-layered co-extruded film composed of the following layers was produced.

Ny (30 μm)/PE (60 μm)/Ny (30 μm)

Thereafter, the tensile strength of the three-layered co-extruded film was measured in the same manner as the practical example 1. The measured result is shown in Table 3-1.

(Evaluation of Measured Results)

As is clear from Table 3-1, the tensile strength of the wrapping clean film produced in the practical example 1 is larger than that of the three-layered co-extruded film produced in the compared example 1. Thus, it was revealed that according to the producing method of this embodiment of the present invention, a wrapping clean film which has high dustfree property and very high tensile strength can be produced.

3-3 Effect

As described above, according to the wrapping clean film producing method of the third embodiment of the present invention, at least two layers of thermoplastic resin films are co-extruded on both the front and rear surfaces of a heat-resisting substrate. By peeling off and removing the outermost layer film, clean surfaces appear. According to this method, the wrapping strength such as tensile strength of the wrapping clean film is improved. In addition, the dustfree property of the wrapping clean film is high. Moreover, a desired property such as pin-hole resisting property and gas barrier property can be easily provided.

Fourth Embodiment 4-1 Basic Construction

Figure 8:
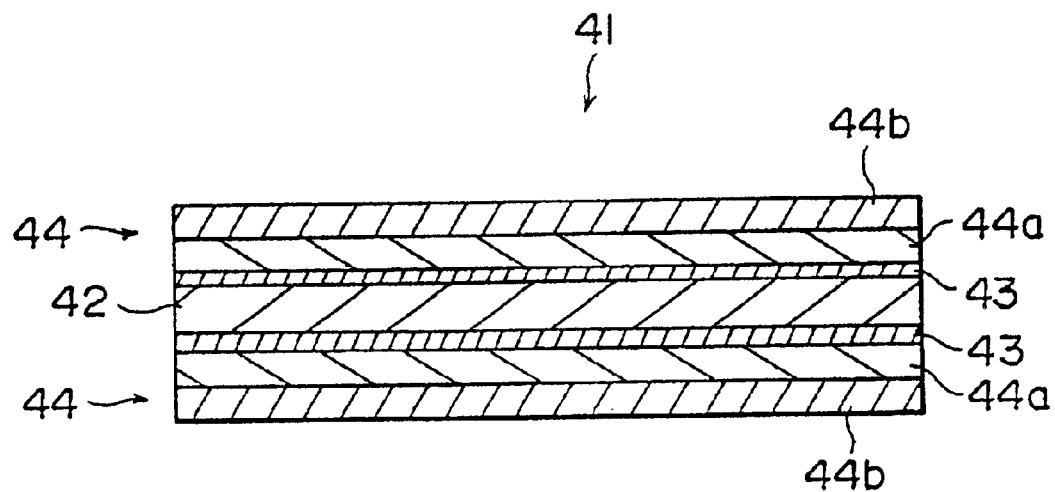
FIG. 8 is a sectional view showing the composition of layers of a wrapping clean film produced by a producing method according to a fourth embodiment of the present invention.
Figure 9:
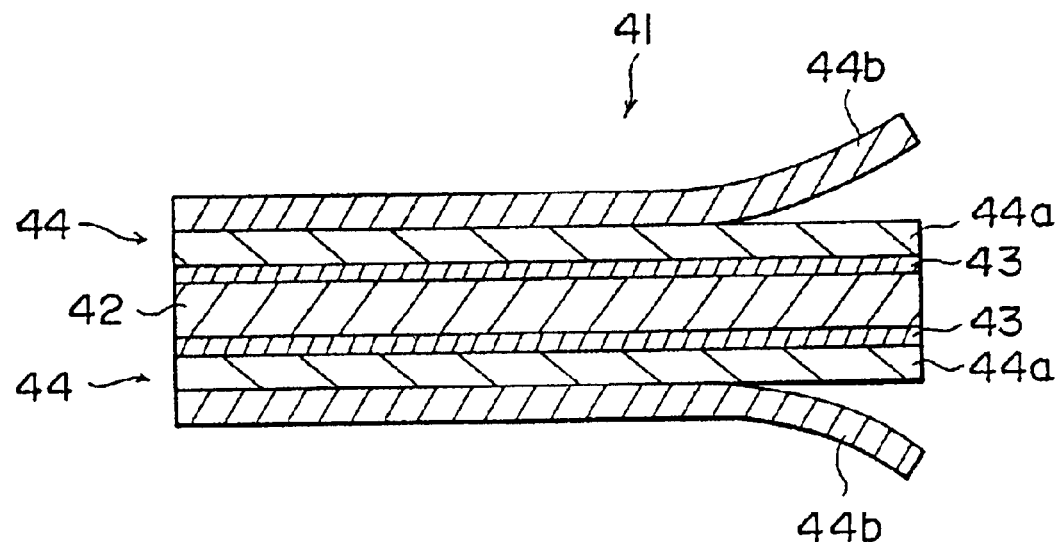
FIG. 9 is a sectional view for explaining the condition where outer layer films of the wrapping clean film of FIG. 8 are peeled off.

FIGS. 8 and 9 shows a wrapping clean film producing method according to a fourth embodiment of the present invention. In the fourth embodiment, a heat resisting substrate 42 is used as an intermediate layer.

Examples of the material of the heat-resisting substrate 42 are a stretch nylon (ONy) film, a vinylidene-chloride-film-coated stretch nylon film (KON), a polyethylene terephthalate (PET) film, a vinylidene-chloride-film-coated polyethylene terephthalate (KPET) film, an ethylene acetic vinylalcohol soap (EVOH) film, a polychlorinated vinylidene (PVDC) film, an aluminum foil, an inorganic oxide evaporated PET film, and an aluminum evaporated PET film. In these examples, a biaxial stretch nylon (ONy) film and a biaxial stretch PET film are much preferable.

Since the thickness of the heat-resisting substrate 42 depends on the characteristics thereof, the type of an object to be wrapped, and so forth, it is difficult to designate the thickness of the heat-resisting substrate 42. The thickness of the heat-resisting substrate 42 is normally in the range from 10 to 30 μm.

When necessary, printing may be performed on either or both the surfaces of the heat-resisting substrate 42.

In the wrapping clean film producing method according to this embodiment of the present invention, the co-extruded film 44 composed of at least two layers of thermoplastic resin films 44a and 44b are dry-laminated on both the front and rear surfaces of the heat-resisting substrate 42.

Examples of the material of a bonding agent 43 used for the dry lamination are an urethane group bonding agent and a polyester group bonding agent.

In the wrapping clean film producing method according to this embodiment of the present invention, the co-extruded film 44 is formed by co-extruding at least two layers of thermoplastic resin films 44a and 44b. Examples of a pair of materials (film forming resin on the side of the heat-resisting substrate/film forming resin of the outermost layer film) of the thermoplastic resins being co-extruded are (polyethylene (PE)/polypropylene (PP)), (polyethylene (PE)/nylon (Ny)), (polyethylene (PE)/polyethylene terephthalate (PET)), and (polyethylene (PE)/ethylene acetic vinylalcohol soap (EVOH)). In these examples, combinations of (polyethylene (PE)/polypropylene (PP)) and (polyethylene (PE)/nylon (Ny)) are much preferable. Depending on a desired property such as pin-hole resisting property and gas barrier property, these materials may be used in combination.

To securely dry-laminate the co-extruded film 44 and the heat-resisting substrate 42 and to prevent the co-extruded film 44 from peeling off from the heat-resisting substrate 42, a surface treatment such as corona treatment is preferably performed.

The co-extruded film 44 can be formed by co-extruding two or more thermoplastic resins which are in a molten state according to for example T-die method. Although the co-extruding temperature depends on the combination of thermoplastic resins, it cannot be generally designated. For the combination of the polyethylene (PE) and nylon (Ny), the co-extruding temperature is normally 290° C. or below, preferably 240° C. or below. When the co-extruding temperature exceeds 290° C., the peeling property of the nylon film which forms the outermost layer may deteriorate.

As shown in FIG. 8, the wrapping clean film 41 is formed by dry-laminating the co-extruded films 44 composed of at least two layers of thermoplastic resin films 44a and 44b on both the front and rear surfaces of the heat-resisting substrate 42 or through the corresponding respective bonding agent layers 43. Since at least two layers of thermoplastic resin films 44a and 44b which form the co-extruded film 44 are laminated by the co-extrusion method, the surface of the thermoplastic resin film 44a is never exposed to outer air while and after the wrapping clean film 41 is produced. Thus, after the wrapping clean film 41 is produced and before it is used, dirt and dust never adhere to the surface of the thermoplastic resin films 44a.

As shown in FIG. 9, by peeling off and removing the outermost thermoplastic resin film 44b, a clean surface of the thermoplastic resin film 44a appears. Thus, the wrapping clean film 41 can be used as a wrapping material of an object such as a semiconductor product which requires high cleanness.

As long as the outermost thermoplastic resin film 44b is applied to coats the front surface of the inner thermoplastic resin film 44a, the peeling strength of the outermost thermoplastic resin film 44b from the inner thermoplastic resin film 44a is preferably as low as possible. In the case that the peeling strength becomes large, when the outermost thermoplastic resin film 44b is peeled off and removed from the inner thermoplastic resin film 44a, large static electricity takes place on the surface of the inner thermoplastic resin film 44a. The large static electricity tends to collect dirt and dust.

4-2 PRACTICAL EXAMPLE

Next, a practical example according to the fourth embodiment of the present invention and a compared example thereof will be practically described.

Practical Example 1

The front surface of a 15 μm thick stretch nylon (ONy) film (UNITIKA LTD., "EMBLEM ON", density=1.15) was gravure-printed. The resultant film was used as a heat-resisting substrate.

Next, a two-liquid type urethane bonding agent (TAKEDA CHEMICAL INDUSTRIES, LTD., "TAKELAC A-515"/"TAKENATE A-50") was applied on both the front and rear surfaces of the heat-resisting substrate so as to form 3 μm thick bonding agent layers.

A polyethylene (PE) (NIPPON UNICAR CO., LTD., "NUC 8160", density=0.923, MI=2.4 g/10 min.) and a nylon (Ny) (UBE INDUSTRIES, LTD., "5033B", density=1.14) were co-extruded by a conventional method so as to form a co-extruded film composed of a 40 μm thick polyethylene (PE) film and a 20 μm thick nylon (Ny) film. Thereafter, the surface of the polyethylene (PE) film was corona-treated.

Next, the co-extruded film was dry-laminated on the bonding agent (LMD) layer on each of the front and rear surfaces of the heat-resisting substrate. Thus, a wrapping clean film constructed of the following layers was produced.

PE (40 μm)/Ny (20 μm)/LMD/ONy (15 μm)/print layer/LMDAC/PE (40 μm)/Ny (20 μm)

Next, the nylon film, which was the outermost layer, of the wrapping clean film was peeled off and removed. The tensile strength of the resultant wrapping clean film was measured. The measured result is shown in Table 4-1.

TABLE 4-1

|  | Tensile strength [kg/cm$^2$] | Static electricity [kv] |
|---|---|---|
| Practical example 1 | 2000 | 5 |
| Compared example 1 | 400 | 20 |

The tensile strength of each example was measured in the following conditions.

| Tensile strength testing device | TENSILON |
|---|---|
| Velocity | 300 mm/min |
| Angle | 180° |

Compared Example 1

A nylon (Ny) (UBE INDUSTRIES, LTD., "5033B", density=1.14 g/cm$^3$) and a polyethylene (PE) (NIPPON UNICAR CO., LTD., "NUC 8160", density=0.923, MI=2.4 g/10 min.) were co-extruded. Thus, a three-layered co-extruded film composed of the following layers was produced.

Ny (30 μm)/PE (60 μm)/Ny (30 μm)

Thereafter, the tensile strength of the three-layered co-extruded film was measured in the same manner as the practical example 1. The measured result is shown in Table 4-1.

(Evaluation of Measured Results)

As is clear from Table 4-1, the tensile strength of the wrapping clean film produced in the practical example 1 is larger than that of the three-layered co-extruded film produced in the compared example 1. Thus, it was revealed that according to the producing method of this embodiment of the present invention, a wrapping clean film which has high dustfree property and very high tensile strength can be produced.

4-3 Effect

As described above, according to the wrapping clean film producing method of the fourth embodiment of the present invention, a co-extruded film composed of at least two layers of thermoplastic resin films is laminated on each of the front and rear surfaces of a heat-resisting substrate by dry lamination method. By peeling off and removing the outermost layer film, clean surfaces appear. According to this method, the wrapping strength such as tensile strength of the wrapping clean film is improved. In addition, the dustfree property of the wrapping clean film is high. Moreover, a desired property such as pin-hole resisting property and gas barrier property can be easily provided.

Fifth Embodiment 5-1 Basic Construction

Figure 10:
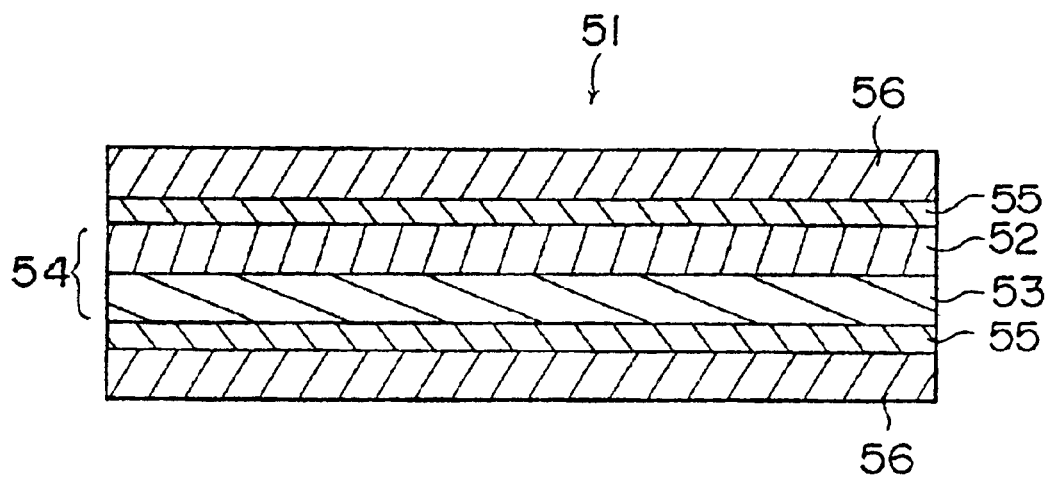
FIG. 10 is a sectional view showing the composition of layers of a wrapping clean film produced by a producing method according to a fifth embodiment of the present invention.
Figure 11:
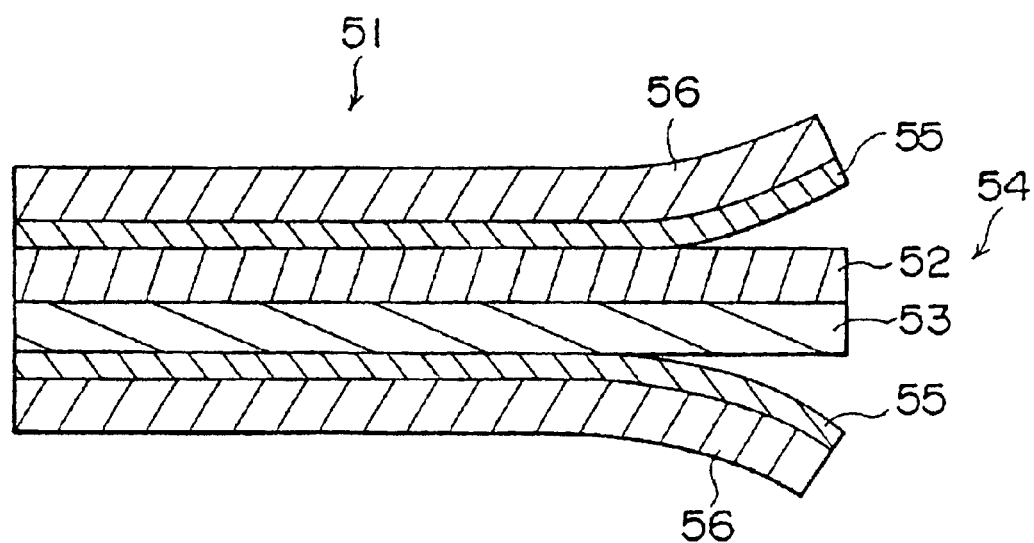
FIG. 11 is a sectional view for explaining the condition where cover films and respective adhesive films of the wrapping clean film of FIG. 10 are peeled off.

FIGS. 10 and 11 show a wrapping clean film producing method according to a fifth embodiment of the present invention. In the fifth embodiment, a heat-resisting substrate 52 and a polyolefin film 53 are laminated so as to form an intermediate layer 54.

Examples of the material of the heat-resisting substrate 52 are a stretch nylon (ONy) film, a vinylidene-chloride-film-coated stretch nylon film (KON), a polyethylene terephthalate (PET) film, a vinylidene-chloride-film-coated polyethylene terephthalate (KPET) film, a stretch polypropylene (OPP) film, a vinylidene-chloride-film-coated stretch polypropylene (KOP) film, an ethylene acetic vinylalcohol soap (EVOH) film, a polychlorinated vinylidene (PVDC) film, an aluminum foil, an inorganic oxide evaporated PET film, and an aluminum evaporated PET film. In these examples, stretch polypropylene (OPP) film, a biaxial stretch nylon (ONy) film, and a biaxial stretch PET film are much preferable.

Since the thickness of the heat-resisting substrate 52 depends on the characteristics thereof, the type of an object to be wrapped, and so forth, it is difficult to designate the thickness of the heat-resisting substrate 52. The thickness of the heat-resisting substrate 52 is normally in the range from 10 to 30 μm.

Examples of the material of the polyolefin film 53 layered on the heat-resisting substrate 52 are a low density polyethylene (LDPE) film, a straight chain low density polyethylene (L-LDPE) film, a non-stretch polypropylene (CPP) film, an ethylene vinyl acetate copolymer (EVA) film, and an ionomer resin film.

The thickness of the polyolefin film 53 is normally in a range from 30 to 100 μm, preferably in a range from 40 to 60 μm.

The heat-resisting substrate 52 and the polyolefin film 53 may be laminated by properly using, for example dry-lamination method. Examples of a bonding agent 55 for use in the dry-lamination method are an urethane group bonding agent and a polyester group bonding agent.

When the heat-resisting substrate 52 and the polyolefin film 53 are laminated by the dry-lamination method, the bonding surfaces of the heat-resisting substrate 52 and the polyolefin film 53 are preferably surface-treated by for example corona treatment.

The thickness of the intermediate layer 54 is normally in a range from 45 to 150 μm, preferably in the range from 50 to 100 μm.

In the wrapping clean film producing method according to the this embodiment of the present invention, cover film layers 56 are laminated on both the front and rear surfaces of the intermediate layer 54 through the corresponding respective bonding agent layers 55. The bonding agent layers 55 are interfacially peeled off from the front and rear surfaces of the intermediate layer 54.

Examples of the material of the bonding agent forming the bonding agent layers 55 which can be interfacially peeled off from each of the front and rear surfaces of the intermediate layer 54 are a solvent type urethane group bonding agent, an acrylic group bonding agent, and a rubber group bonding agent.

The surfaces of the heat-resisting substrate 52 and the polyolefin film 53 of the intermediate layer 54 on which the bonding agent layers 55 are formed are not necessarily surface-treated by for example corona-treatment. When the surface treatment such as corona-treatment is performed for these surfaces, the adhesive force between these surfaces and the bonding agent layers becomes strong, thereby preventing the bonding agent layers from being interfacially peeled off.

The cover film layers 56 are laminated on both the front and rear surfaces of the intermediate layer 54 through the respective bonding agent layers 55. Examples of the cover films which form the cover film layers 56 are a polyethylene film (PEF), a polyester film, and a polypropylene film.

The bonding surface of each of the cover film layers 56 is preferably surface-treated by for example corona-treatment. The corona-treatment causes the adhesive force between the cover film layer and the bonding agent layer to increase, thereby preventing the cover film layer from being interfacially peeled off from the bonding agent layer.

The thickness of the cover film layer 56 is normally in a range from 10 to 50 μm, preferably in a range from 12 to 40 μm.

In the wrapping clean film producing method according to this embodiment of the present invention, after the cover film layers 56 are laminated on both the front and rear surfaces of the intermediate layer 54 through the respective bonding agent layers 55, an aging treatment is performed.

The period of time of the aging treatment is normally 24 hours or more, preferably 72 hours or more. The temperature of the aging treatment is normally in a range from 25° C. to 60° C., preferably in the range from 30° C. to 50° C.

The aging treatment allows the cover film layers 56 and the bonding agent layers 55 to be interfacially peeled off from the intermediate layer 54.

As shown in FIG. 10, in the wrapping clean film 51 produced in the above-described manner, the heat-resisting substrate 52 and the polyolefin film 53 are laminated by the dry-lamination method so as to form the intermediate layer 54. The cover film layers 56 are laminated on both the front and rear surfaces of the intermediate layer 54 through the respective bonding agent layers 55. Since the cover film layers 56 and the respective bonding agent layers 55 are interfacially peeled off from the intermediate layer 54, even if dirt and dust adhere to both the front and rear surfaces of the intermediate layer 54 while this wrapping clean film is being produced, the dirt and dust are removed from both the front and rear surfaces of the intermediate layer along with the bonding agent layers.

Thus, as shown in FIG. 11, when the cover film layers 56 and the respective bonding agent layers 55 are interfacially peeled off and removed from the intermediate layer 54, the clean surfaces of the intermediate layer 54 appear. Thus, the wrapping clean film 51 can be used for a wrapping material of an object such as a semiconductor product which requires high cleanness.

As long as the cover film layers 56 coat the surfaces of the intermediate layer 54, the peeling strength of the bonding agent layers 55 from the heat-resisting substrate 52 and the polyolefin film 53 which form the intermediate layer 54 is preferably as low as possible. In the case that the peeling strength becomes large, when the cover films 56 and the respective bonding agent layers 55 are peeled off and removed from the intermediate layer 54, large static electricity takes place on the surface of the heat-resisting substrate 52 and the polyolefin film 53. The large static electricity tends to collect dirt and dust.

5-2 PRACTICAL EXAMPLE

Next, a practical example according to the fifth embodiment of the present invention and a compared example thereof will be practically described.

Practical Example 1

One surface of a heat-resisting substrate made of a 20 μm thick stretch polypropylene (OPP) film (TORAY INDUSTRIES, INC., "TOREPHANE BO") was corona-treated. In addition, one surface of a polyolefin film made of a 50 μm thick polyethylene film (PEF) (AICELLO CHEMICAL CO., LTD., "SUZURON L") was corona-treated. The corona-treated surfaces of the heat-resisting substrate and the polyolefin film were bonded with a two-solution type urethane group bonding agent (TAKEDA CHEMICAL INDUSTRIES, LTD., "TAKELAC A-515"/"TAKENATE A-50") by dry-lamination method so as to form an intermediate layer.

Next, the two-solution type urethane group bonding agent (TAKEDA CHEMICAL INDUSTRIES, LTD., "TAKELAC A-515"/"TAKENATE A-50") was applied to the stretch polypropylene (OPP) film which forms the intermediate layer so that this film and the corona-treated surface of the 50 μm thick polyethylene film (PEF) (AICELLO CHEMICAL CO., LTD., "SUZURON L") were bonded.

The two-solution type urethane group bonding agent (TAKEDA CHEMICAL INDUSTRIES, LTD., "TAKELAC A-515"/"TAKENATE A-50") was applied to the polyethylene film (PEF) which forms the intermediate layer so that this film and the corona-treated surface of the 50 μm thick polyethylene film (PEF) (AICELLO CHEMICAL CO., LTD., "SUZURON L") were bonded. Thus, a laminate composed of the following layers was provided.

PEF (50 μm)/bonding agent layer/OPP (20 μm)/LMD/PEF (50 μm)/bonding agent layer/PEF (50 μm)

Thereafter, an aging process was performed for the laminate for 24 hours at a temperature of 40° C. Thus, a wrapping clean film was produced.

Next, the polyethylene film (PEF) layers as the outermost layers of the wrapping clean film and the respective bonding agent layers were interfacially peeled off and removed from the intermediate layer. The number of particles adhered on the surfaces of the intermediate layer was measured. The measured result is shown in Table 5-1.

TABLE 5-1

|  | Number of particles adhered [particles/m$^2$] |
| --- | --- |
| Practical example 1 | 50 |
| Compared example 1 | 108,000 |

The number of particles adhered on the surfaces of the intermediate layer was measured in the following manner.

A specimen film was cleaned in dustfree pure water which was filtered. The number of particles per m$^2$ whose particle diameter exceeded 0.5 μm and which were separated in the pure water was measured by a particle counter (made by RION CORP.).

Compared Example 1

As with the same manner as the production of the intermediate layer in the practical example 1, a wrapping film composed of the following layers was produced. In the same manner as the practical example 1, the number of particles adhered on the surfaces of the wrapping film was measured.

OPP (20 μm)/LMD/PEF (50 μm)
(Evaluation of Measured Results)

As is clear from Table 5-1, the number of particles adhered on the exposed surfaces of the wrapping clean film produced in the practical example 1 is much less than that produced in the compared example 1. Thus, it was revealed that according to the producing method of the fifth embodiment of the present invention, a wrapping clean film whose exposed surfaces have high cleanness can be provided.

5-3 Effect

As described above, according to the wrapping clean film producing method of the fifth embodiment of the present invention, an intermediate layer is composed of a heat-resisting substrate and a polyolefin film which are layered. Cover film layers are layered on both the front and rear surfaces of the intermediate layer through the respective bonding agent layers which are interfacially peeled off. By peeling off and removing the cover film layers and the respective bonding agent layers, the clean surfaces of the intermediate layer appear. Thus, a wrapping clean film to which dirt and dust never adhere and which does not require a cleaning can be effectively produced.

Sixth Embodiment 6-1 Basic Construction

Next, with reference to FIGS. 12 and 13, a sixth embodiment of the present invention will be described.

Figure 12:
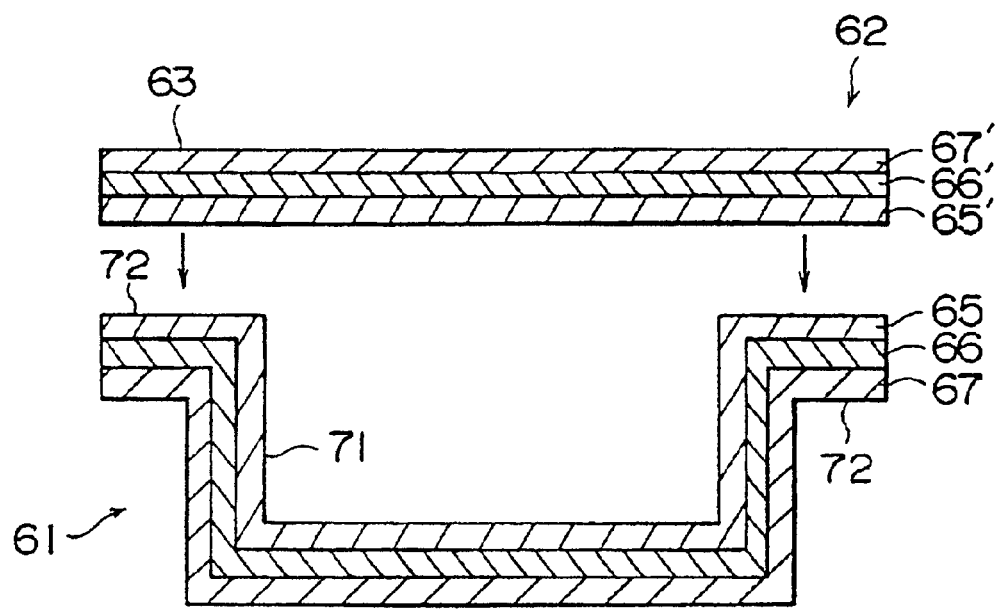
FIG. 12 is a sectional view schematically showing a main body and cover member before surface protecting layers are not peeled off.

FIG. 12 is a sectional view schematically showing a state where a dustfree container according to the sixth embodiment of the present invention has not been assembled. FIG. 13 is a sectional view schematically showing the state where an object is wrapped by the dustfree container of FIG. 12.

As shown in FIG. 12, the dustfree container is composed of a main body 61 and a cover member 62. The cover member 62 is heat-sealed to a flange 72 formed at the periphery of an accommodating portion 71 of the main body 61.

Figure 13:
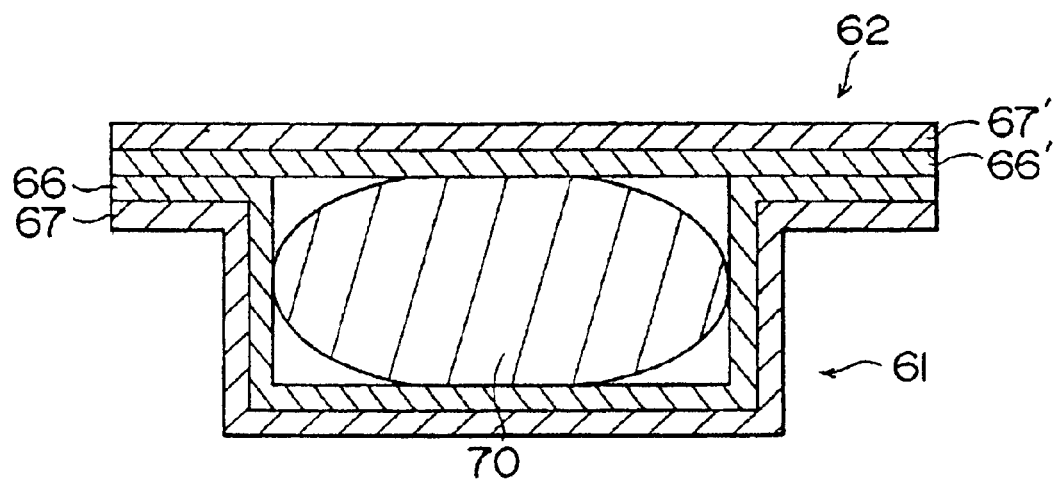
FIG. 13 is a sectional view schematically showing the dustfree container of FIG. 12 where an object is accommodated in the dustfree container in the condition that surface protecting layers are peeled off from the main body and the cover member and then inner layer films are heat-sealed.

As shown in FIG. 13, the main body 61 has the accommodating portion 71 and the flange 72. The accommodating portion 71 accommodates an object 70. At the flange 72, the cover member 62 is heat-sealed. The main body 61 is integrally formed of a clean film 63 which is a laminate film having an inner layer film 66 and an outer layer film 67.

FIG. 15 is a sectional view showing the composition of layers of the clean film 63.

As shown in the figure, in the clean film 63, the inner layer film 66 is sandwiched by the outer layer film 67 and a surface protecting layer 65. The clean film 63 is produced by for example co-extrusion method. When the surface protecting layer 65, the inner layer film 66, and the outer layer film 67 are laminated by a multi-layer extruder, both the front and rear surfaces of the inner layer film 66 are not directly exposed to outer air while and after the dustfree container is produced. Thus, dirt and dust never adhere to the surfaces of the inner film 66 after the dustfree container is produced and before it is used.

Although the materials of the surface protecting layer 65, the inner layer film 66, and the outer layer film 67 of the clean film 63 are indistinguishably used, bonding force of these layers at their interfaces should be weak.

To prevent the outer layer film 67 from adhering to the seal head in heat-sealing the main body 61 and the cover member 62, the melting point of the resin of the outer layer film 67 must be higher than that of the resin of the inner layer film 66.

An example of the material of the inner layer film 66 is polypropylene (PP).

The thickness of the inner layer film 66 is normally in a range from 20 to 150 μm, preferably in a range from 30 to 100 μm.

Examples of the material of the outer layer film 67 laminated on the inner layer film 66 are nylon (Ny), polyethylene terephthalate (PET), and ethylene vinyl alcohol copolymer (EVOH).

The thickness of the outer layer film 67 is normally in a range from 10 to 60 μm, preferably in a range from 30 to 50 μm.

In this embodiment, the inner layer film 66 is sandwiched by the outer layer film 67 and the surface protecting layer 65.

Examples of the material of the surface protecting layer 65 are polyethylene (PE), polyethylene terephthalate (PET), and ethylene vinyl alcohol copolymer (EVOH). In these examples, a low density polyethylene (L-DPE) with a density in a range from 0.900 to 0.960 g/cm$^3$ is preferably used. A low density polyethylene (L-DPE) with a density in the range from 0.915 to 0.930 g/cm$^3$ is more preferably used.

The thickness of the surface protecting layer 65 is normally in a range from 30 to 150 μm, preferably in a range from 50 to 100 μm.

In the clean film 63, a much preferable combination of the materials of the main body 61 (the surface protecting layer 65, the inner layer film 66, and the outer layer film 67) is (polyethylene (PE), polypropylene (PP), non-stretch nylon (CNy)). For example, the thickness of the surface protecting layer 65 made of a polyethylene (PE) film is 100 μm. The thickness of the inner layer film 66 made of a polypropylene (PP) film is 30 μm. The thickness of the outer layer film 67 made of a non-stretch nylon (Ny) film is 30 μm.

The main body 61 made of the clean film 63 is deep-drawn by vacuum forming method or pressure forming method so as to provide the accommodating portion 71 corresponding to the shape of an object to be wrapped.

A clean film 63' which is the material of the cover member 62 is preferably composed of a surface protecting layer 65', an inner layer film 66', and an outer layer film 67' disposed in this order. The inner layer film 66' is disposed on the flange side of the main body 61. This layer composition of the clean film 63' is the same as that of the clean film 63 which forms the main body 61. In addition, the material of each layer which forms the cover member 62 is similar to that of each layer which forms the main body 61. The cover member 62 does not require a higher mechanical strength than the main body 61 does. Thus, the thickness of the surface protecting layer 65' is in a range from 20 to 60 μm. The thickness of the inner layer film 66' is in a range from 30 to 100 μm. The thickness of the outer layer film 67' is in a range from 30 to 50 μm.

Much preferable materials of the surface protecting layer 65', the inner layer film 66', and the outer layer film 67' are polyethylene (PE), polypropylene (PP), and non-stretch nylon (CNy), respectively. An example of the thickness of each layer is as follows. The thickness of the surface protecting layer 65' made of a polyethylene (PE) film is 30 μm. The thickness of the inner layer film 66' made of a polypropylene (PP) film is 30 μm. The thickness of the outer layer film 67' made of a non-stretch nylon (CNy) film is 30 μm.

It should be noted that the clean film 63, which forms the main body 61, and the clean film 63', which forms the cover member 62, may be produced by peelably laminating each layer with a bonding agent which has peelable property.

The surface protecting layers 65 and 65' are peeled off from the main body 61 and the cover member 62 by a filling and sealing apparatus in a clean atmosphere, respectively. Next, an object 70 such as a semiconductor wafer is accommodated in the accommodating portion 71 of the main body 61. At the flange 72 formed on the main body 61, the inner layer film 66 of the clean film 63 which forms the main body 61 and the inner layer film 66' of the clean film 63' which forms the cover member 62 are heat-sealed. At this time, normally, the inside of the heat-sealed inner layer films 66 and 66' is deaerated. The outer surface of the main body 61 is formed of the outer layer film 67 of the clean film 63. The outer surface of the cover member 62 is formed of the outer layer film 67' of the clean film 63'. These outer layer films 67 and 67' can be easily peeled off and removed from the inner layer films 66,66'.

In other words, as shown in FIG. 14, when the outer layer film 67 is peeled off and removed, a clean surface of the inner layer film 66 of the clean film 63 which forms the container main body 61 appears. When the outer layer film 67' is peeled off and removed, a clean surface of the inner layer film 66' of the clean film 63' which forms the cover member 62 appears. Thus, the object is wrapped with a dustfree container. In other words, after the outer layer films 67 and 67' are peeled off and removed in, for example, a clean room, the object wrapped with the dustfree container is further wrapped with an outer bag made of a clean film. The wrapped object is conveyed to another clean room. In this clean room, the outer bag and the cover member 62 are removed. Thus, the outer surfaces of the main body 61 and the cover member 62 which form the dustfree container are formed of clean surfaces of the inner layer films 66 and 66'.

Consequently, when the dustfree container is opened, dirt and dust never fly. Therefore, the object such as semiconductor wafer can be taken out from the dustfree container in a clean atmosphere. When the object wrapped with the dustfree container is further wrapped with the outer bag, a clean film similar to the clean film 63' which is the material of the cover member 62 may be used as the material of the outer bag.

6-2 Effect

As described above, according to the sixth embodiment of the present invention, a dustfree container is composed of a main body and a cover member. The main body accommodates an object to be wrapped. The cover member covers an accommodating portion of the main body. Both the main body and the cover member are made of a clean film. The clean film is composed of an inner layer film and an outer layer film. Since the outer layer film is peelable from the inner layer film, the outer layer film prevents dirt and dust from contaminating the inner layer film. Thus, the dustfree container can be formed in any shape corresponding to the shape of an object to be wrapped. In addition, when the cover member is opened, dirt and dust never fly. Consequently, the dustfree container is suitable for wrapping an object such as a semiconductor wafer.

Seventh Embodiment 7-1 Basic Construction

With reference to FIGS. 16 and 17, a seventh embodiment of the present invention will be described. As shown in FIG. 16, a wrapping clean film 80 is composed of an inner layer film 82 and outer layer films 81 and 83. The inner layer film 82 wraps an object. The outer layer films 81 and 83 peelably are applied to both the front and rear surfaces of the inner layer film 82 so as to prevent the inner layer film 82 from being contaminated.

In a clean atmosphere, as shown in FIG. 16, when the outer layer films 81 and 83 are peeled off from the wrapping clean film 80, the inner layer film 82 as a dustfree film appears. When a wrapping bag is formed of the inner layer film 82 in a clean atmosphere, the inside and outside surfaces of the bag are clean. Thus, before the outer layer films 81 and 83 are peeled off, the clean film 80 can be placed in a conventional atmosphere rather than a clean room.

In addition, as shown in FIG. 17, a wrapping clean film 75 is composed of an inner layer film 76 and an outer layer film 77. The inner layer film 76 wraps an object. The outer layer film 77 is peelably applied to a surface of the inner layer film 76 so as to prevent the surface thereof from being contaminated.

The outer layer film 77 of the wrapping film 75 shown in FIG. 17 is made of a heat-sealable resin. A wrapping bag is formed of the wrapping film 75 so that the outer layer film 77 is disposed on the outer surface of the wrapping bag. Next, an object is inserted into the wrapping bag. Just before the wrapping bag is conveyed to a clean room, the outer layer film 77 is peeled off from the wrapping film 75. Thus, the outer surface of the wrapping bag can be free of dust. Therefore, when an object wrapped with the wrapping bag is transported to a clean room, dust which adheres to the wrapping bag never enters the clean room.

Thus, since the wrapping bag can be produced with the wrapping film 75 shown in FIG. 17, it is not necessary to take a dual wrapping bag to a clean room. As a result, the wrapping process of an object can be simplified. In addition, the cost of wrapping materials can be reduced.

7-2 Production Method

The wrapping films 80 and 75 shown in FIGS. 16 and 17 can be produced by co-extrusion method such as the T-die method or the inflation method. The wrapping films 80 and 75 can be laminated by dry-lamination method or polyethylene sand lamination method.

7-3 PRACTICAL EXAMPLES

Next, practical examples according to the seventh embodiment of the present invention and compared examples thereof will be practically described. Table 7-1 shows practical examples of the wrapping film 80.

TABLE 7-1

| Practical Example | Film Composition | Inner Film Composition | Remarks |
|---|---|---|---|
| 1 | Ny/PE/Ny | PE | Light Wrapping |
| 2 | PE/Ny/ON/PE/Ny | Ny/ON/PE | Dual Wrapping, Printable |
| 3 | PE/Ny/ON/Al/PE/Ny | Ny/ON/Al/PE | Gas Barrier Wrapping, Opaque, Printable |
| 4 | PE/Ny/ON/VM PET*/PE/Ny | Ny/ON/VM PET/PE | Gas Barrier Wrapping, Transparent, Printable |

In Table 7-1, *VM PET is a SiOx transparent evaporated PET, the underlined portions represent portions being co-extruded.

Table 7-2 shows practical examples of the wrapping film 75.

TABLE 7-2

| Practical Example | Film Composition | Inner Film Composition | Remarks |
|---|---|---|---|
| 5 | Ny/PE | PE | Light Wrapping |
| 6 | PE/Ny/ON/PE | Ny/ON/PE | Dual Wrapping, Printable |
| 7 | PE/Ny/ON/Al/PE | Ny/ON/Al/PE | Gas Barrier Wrapping, Opaque, Printable |
| 8 | PE/Ny/ON/VM PET*/PE | Ny/ON/VM PET/PE | Gas Barrier Wrapping, Transparent, Printable |

In Table 7-2, *VM PET is a SiOx transparent evaporated PET, the underlined portions represent portions being co-extruded.

Next, the practical examples 1 to 8 will be described in detail.

Practical Example 1

Film composition: Ny (nylon) (15 μm)/PE (polyethylene) (80 μm)/Ny (nylon) (15 μm)

A three-layered co-extruded film was produced by known extrusion method.

Polyethylene resin: MITSUI PETROCHEMICAL INDUSTRIES, LTD., "M-206", density=0.923, MI=3.7

Nylon resin: UBE INDUSTRIES, LTD., LTD., "5033B", density=1.14 g/cm³.

Table 7-3 shows extrusion temperature conditions.

TABLE 7-3

| | Extrusion Temperature Conditions (Unit: ° C.) | | | | |
|---|---|---|---|---|---|
| | Below hopper | Screw 1 | Screw 2 | Screw 3 | T-die |
| Polyethylene | 130 | 150 | 180 | 180 | 240 |
| Nylon | 150 | 180 | 220 | 220 | 240 |

Practical Example 2

Film composition: PE (50 μm)/Ny (20 μm)/bonding agent/ON (stretch nylon) (15 μm)/bonding agent/PE (50 μm)/Ny (20 μm) (Nylon was disposed inside the bag.)

(1) A two-layered co-extruded film (PE (50 μm)/Ny (20 μm)) was produced by known extrusion method with the same resins and film forming conditions as the practical example 1.

(2) Next, a biaxial stretch nylon film (UNITIKA LTD., "EMBLEM ON", 15 μm) was gravure-printed. By applying an urethane group bonding agent (TAKEDA CHEMICAL INDUSTRIES, LTD., "TAKELAC A-515"/ "TAKENATE A-50") on both the surfaces of the biaxial stretch nylon film, the PE/Ny co-extruded film produced in (1) was dry-laminated so that the above film composition was provided.

Practical Example 3

Film composition: PE (50 μm)/Ny (20 μm)/bonding agent/ON (15 μm)/bonding agent/Al (aluminum) foil (7 μm)/bonding agent/PE (50 μm)/Ny (20 μm) (Nylon was disposed inside the bag.)

(1) A two-layered co-extruded film (PE (50 μm)/Ny (20 μm)) was produced by known extrusion method with the same resins and film forming conditions as the practical example 1.

(2) Next, a biaxial stretch nylon film (UNITIKA LTD., "EMBLEM ON", 15 μm) was gravure-printed. By applying an urethane group bonding agent (TAKEDA CHEMICAL INDUSTRIES, LTD., "TAKELAC A-515"/ "TAKENATE A-50") on both the surfaces of the biaxial stretch nylon film, an aluminum foil (SUMIKEI ALUMINUM FOIL CO., LTD., "BESPA", 7 μm) was dry-laminated. Next, the PE/Ny co-extruded film produced in (1) was dry-laminated on both the surfaces of the ON/Al so that the above film composition was provided.

Practical Example 4

Film composition: PE (50 μm)/Ny (20 μm)/bonding agent/ON (15 μm)/bonding agent/SiOx evaporated PET (12 μm)/bonding agent/PE (50 μm)/Ny (20 μm) (Nylon was disposed inside the bag.)

(1) A two-layered co-extruded film (PE (50 μm)/Ny (20 μm)) was produced by known extrusion method with the same resins and film forming conditions as the practical example 1.

(2). Next, a biaxial stretch nylon film (UNITIKA LTD., "EMBLEM ON", 15 μm) was gravure-printed. By applying an urethane group bonding agent (TAKEDA CHEMICAL INDUSTRIES, LTD., "TAKELAC A-515"/ "TAKENATE A-50") on the printed surface of the biaxial stretch nylon film, a SiOx evaporated PET (MITSUBISHI KASEI CORPORATION, "TECH-BATTIER H", 12 μm) was dry-laminated so that the SiOx evaporated surface became the bonding surface. Thereafter, the PE/Ny co-extruded film produced in (1) was dry-laminated on both the surfaces of the ON/SiOx evaporated PET so that the above film composition was provided.

Practical Example 5

Film composition: Ny (20 μm)/PE (50 μm)

The two-layered co-extruded film of the practical example 2 was used as a specimen.

Practical Example 6

Film composition: PE (50 μm)/Ny (20 μm)/bonding agent/ON (15 μm)/bonding agent/PEF (60 μm) (PEF (60 μm) was disposed inside the bag.)

A polyethylene film (PEF) (60 μm) (non-additive grade) was dry-laminated instead of the two-layered film (PE (50 μm)/Ny (20 μm)) disposed inside the bag of the practical example 2.

Practical Example 7

Film composition: PE (50 μm)/Ny (20 μm)/bonding agent/ON (15 μm)/bonding agent/Al foil (7 μm)/bonding agent/PEF (60 μm) (PEF (60 μm) was disposed inside the bag.)

A polyethylene film (PEF) (60 μm) (non-additive grade) was dry-laminated instead of the two-layered film (PE (50 μm)/Ny (20 μm)) disposed inside the bag of the practical example 3.

Practical Example 8

Film composition: PE (50 μm)/Ny (20 μm)/bonding agent/ON (15 μm)/bonding agent/SiOx evaporated PET (12 μm)/bonding agent/PEF (60 μm) (PEF (60 μm) was disposed inside the bag.)

A polyethylene film (PEF) (60 μm) (non-additive grade) was dry-laminated instead of the two-layered film (PE (50 μm)/Ny (20 μm)) disposed inside the bag of the practical example 4.

Compared Example 1

Film composition: ON (15 μm)/bonding agent/PEF (60 μm) (PEF (60 μm) was disposed inside the bag.)

A biaxial stretch nylon film (UNITIKA LTD., "EMBLEM ON", 15 μm) was gravure-printed. By applying an urethane group bonding agent (TAKEDA CHEMICAL INDUSTRIES, LTD., "TAKELAC A-5152"/"TAKENATE A-50") on the printed surface of the biaxial stretch nylon film, a polyethylene film (60 μm) (non-additive grade) was dry-laminated.

Thereafter, the contaminating degree of each of the practical examples 1 to 8 and the compared example 1 was evaluated. Next, the evaluated results are described.

(1) Evaluation of Contaminating Degree of Film Inner Surface

With the films of the practical examples 1 to 4 as specimens, both surfaces of each of the films of the practical examples 1 to 4 were peeled off in class 100 atmosphere and flat pouches were produced. In addition, with the film of the compared example 1, a flat pouch was produced in the same atmosphere. These pouches were evaluated in the following manner.

Each of the flat pouches in class 100 atmosphere was filled with dustfree water. Next, particles which were separated in the water were counted by a submerged particle counter (RION CORP., "KS-58").

The surface contaminating degree was represented with the number of particles per unit area (particles/m$^2$) equivalent to the film surface area and replenished water. Table 7-4 shows the evaluated results.

TABLE 7-4

| | Evaluated Results |
|---|---|
| | Number of particles adhered *1 (particles/m$^2$) |
| Practical example 1 | 180 |
| Practical example 2 | 200 |
| Practical example 3 | 170 |
| Practical example 4 | 175 |
| Compared example 1 | 253,000 |

*1 In Table 7-4, the diameters of particles exceed 0.5 μm.

(2) Evaluation of Contaminating Degree of Film Outer Surface

The films of the practical examples 5 to 8 were used as specimens. With the films of the practical examples 5 to 8 and the film of the compared example, flat pouches were produced in normal atmosphere. A proper dummy (plastic dish) was inserted into each pouch. Thereafter, each pouch was deaerated and sealed. Then, each pouch was left for 24 hours in normal atmosphere.

For each of the pouches of the practical examples 5 to 8, the upper layer was peeled off and then the contaminating degree of the pouch was evaluated. For the pouch of the compared example 1, the contaminating degree thereof was evaluated as it was.

The contaminating degree of the outer surface of each film was evaluated in the following manner.

The surface of each flat pouch was cleaned with dustfree water in class 100 atmosphere. The number of particles which were separated in water was counted by the submerged particle counter (RION CORP., "KS-58").

The surface contaminating degree was represented with the number of particles per unit area (particles/m2) equivalent to the film surface area and replenished water. Table 7-5 shows the evaluated results.

TABLE 7-5

| | Evaluated Results |
|---|---|
| | Number of particles adhered *1 (particles/m$^2$) |
| Practical example 5 | 280 |
| Practical example 6 | 320 |
| Practical example 7 | 250 |
| Practical example 8 | 280 |
| Compared example 1 | 1,800,000 |

*1 In Table 7-5, the diameters of particles exceed 0.5 μm.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A method for producing a wrapping clean film, comprising the steps of:

preparing a heat-resisting substrate;

forming co-extruded films composed of at least two layers of thermoplastic resin films by co-extrusion; and layering and laminating the co-extruded films on both front and rear surfaces of the heat-resisting substrate by dry-lamination, wherein outermost thermoplastic films of the co-extruded films are peelable from inner thermoplastic films of the co-extruded films laminated to said heat-resisting substrate to form said wrapping clean film.

2. The method as set forth in claim 1, further comprising the step of:

applying a bonding agent on both front and rear surfaces of the heat-resisting substrate, where said applying step is followed by said laminating step.

3. The method as set forth in claim 1, further comprising the step of:

corona-treating the surfaces of the co-extruded films which are later placed in contact with the heat-resisting substrate during said laminating step, wherein said corona-treating step is followed by said laminating step.

4. The method as set forth in claim 1, wherein said co-extruding step is performed at a temperature of 290° C. or below.

5. A method for producing a wrapping clean film, and for wrapping an object in the wrapping clean film, comprising the steps of:

preparing a heat-resisting substrate;

co-extruding films comprising at least two layers of thermoplastic resin;

dry-laminating the co-extruded films on both front and rear surfaces of the heat-resisting substrate, so as to produce a wrapping clean film of the co-extruded films wherein the wrapping clean film comprises inner thermoplastic films of the co-extruded films laminated to front and rear surfaces of the heat-resisting substrate having peelable outermost thermoplastic films;

peeling off the outermost thermoplastic resin films from the inner thermoplastic films of the wrapping clean film just outside a clean room and supplying the wrapping clean film to the clean room; and using the wrapping clean film within the clean room to wrap an object.

6. The method of claim 5, further comprising the step of applying a bonding agent on both front and rear surfaces of the heat-resisting substrate, wherein said applying step is followed by said laminating step.

7. The method of claim 5, further comprising the step of corona-treating the surfaces of the co-extruded films which are later placed in contact with the heat-resisting substrate during said laminating step, wherein said corona-treating step is followed by said laminating step.

8. The method of claim 5, wherein said co-extruding step is performed at a temperature of 290° C. or below.

* * * * *